United States Patent [19]

Bolton et al.

[11] Patent Number: 5,386,059
[45] Date of Patent: Jan. 31, 1995

[54] PROCESS FOR PREPARING POLYAMINES FOR LIGHTER COLOR POLYISOCYANATE BASED FOAM

[75] Inventors: Jeffrey S. Bolton; Ramon Kalyanaraman, both of Wheeling; Steven L. Schilling, Glen Dale, all of W. Va.; Clarence D. Blue, Dormagen, Germany

[73] Assignee: Miles Inc., Pittsburgh, Pa.

[21] Appl. No.: 805,407

[22] Filed: Dec. 10, 1991

[51] Int. Cl.6 .......................... C07C 209/78
[52] U.S. Cl. .................. 564/331; 564/333; 564/334
[58] Field of Search ........ 564/333, 395, 331; 560/347

[56] References Cited

U.S. PATENT DOCUMENTS

| | | |
|---|---|---|
| 3,952,042 | 4/1976 | Knöfel .................... 260/453 PH |
| 4,465,639 | 8/1984 | Hatfield, Jr. ................ 260/453 PH |
| 4,792,624 | 12/1988 | Hatfield, Jr. et al. ............ 564/333 |
| 5,173,521 | 12/1992 | Ishino .................................. 524/45 |
| 5,196,591 | 3/1993 | Knofel et al. ...................... 564/331 |
| 5,286,760 | 2/1994 | Bolton et al. ...................... 521/160 |
| 5,310,769 | 5/1994 | König et al. ...................... 521/163 |

FOREIGN PATENT DOCUMENTS 1569226 6/1980 United Kingdom .

*Primary Examiner*—Glennon H. Hollrah
*Assistant Examiner*—Brian M. Burn
*Attorney, Agent, or Firm*—Joseph C. Gil; Lyndanne M. Whalen

[57] ABSTRACT

The present invention encompasses an improved process for preparing polymethylene polyphenyl polyisocyanate comprising reacting phosgene with polymethylene polyphenyl polyamine, the improvement wherein the polymethylene polyphenyl polyamine is acidified prior to phosgenation.

7 Claims, No Drawings

PROCESS FOR PREPARING POLYAMINES FOR LIGHTER COLOR POLYISOCYANATE BASED FOAM

BACKGROUND OF THE INVENTION

1. Field of the Invention

The present invention relates to the process for preparing polyamines which are particularly useful in the preparation of polyisocyanates. More specifically, the present invention relates to the reaction of aniline with formaldehyde in the presence of an acid to produce mixtures of polyamines which are particularly useful in preparing )lighter color polyisocyanates.

2. Brief Description of the Prior Art

Generally, it is known in the art to react aniline with formaldehyde in the presence of an acid to produce polyamines, and to use said polyamines to produce polyisocyanates for use in the preparation of foams. Lately, the color of the foams has become one of the requirements for judging the quality of foams. Foams which are otherwise acceptable can be rejected because of dark color.

Impurities in the polyamines which are used in preparing polyisocyanates for use in the preparation of foams have, at least in part, been blamed for the discoloration in foams. Hence, research in this area has focused on the preparation of polyamines which can be used in preparing lighter color polyisocyanates and foams.

U.S. Pat. No. 4,792,624 discloses that polymethylene polyphenyl polyisocyanates of improved color can be obtained from certain polyamines which are prepared by the following process. The process comprises the preparation of the corresponding polymethylene polyphenyl polyamine by condensing aniline and formaldehyde in the presence of an acid catalyst which is characterized by adding a minor proportion of a polyamine mixture comprising di(aminophenyl)methanes and oligomeric polymethylene polyphenyl polyamines, (collectively known as polymeric MDA to an intermediate stage of the condensation reaction where the various intermediately formed aminobenzylamines are present.

U.S. Pat. No. 4,465,639 discloses addition of controlled amounts of water to the reaction mixture produced by phosgenation of a mixture of polymethylene polyphenyl polyamines (and the like polyamines produced by condensation of formaldehyde and aromatic amines) prior to complete removal of excess phosgene gives rise to the corresponding polymethylene polyphenyl polyisocyanates having significantly improved properties such color of the polyisocyanates.

By the present invention, there is provided an alternate means of obtaining lighter color polyisocyanates.

SUMMARY OF THE INVENTION

The present invention encompasses an improved process for preparing polymethylene polyphenyl polyisocyanate comprising reacting phosgene with polymethylene polyphenyl polyamine, the improvement wherein the polymethylene polyphenyl polyamine is acidified prior to phosgenation.

In a presently preferred embodiment of the invention, the improved process comprises preparing a polyamine mixture by reacting aniline with formaldehyde in the presence of an acid catalyst, followed by neutralizing the resultant polyamine mixture with a base, the improvement comprising effectively acidifying the polyamine (more aptly described as re-acidifying) to neutralize excess base and produce an acidic polyamine mixture prior to phosgenating the polyamine. In a particularly preferred embodiment of the invention, the polyamine is continuously acidified by treating it with aqueous anhydrous hydrogen chloride, after neutralization and just prior to or during purification.

Advantageously, the amount of acid introduced by this process was such as did not cause an equipment upset such as localized corrosion.

DETAILED DESCRIPTION OF THE INVENTION

The acidified polyamine mixture of the present invention is prepared by reacting aniline with formaldehyde in the presence of an acid catalyst such as hydrochloric acid, followed by treating the polyamine mixture with a base such as caustic soda and then re-acidifying the polyamine mixture.

Surprisingly, it has been found that in accordance with the present invention, the process step of acidifying the polyamine mixture under certain conditions can result in a polyamine mixture which is useful in the preparation of lighter color polyisocyanates and foams. It is a distinct feature of the invention that the step of acidifying the polyamine occurs after the preparation and neutralization of the polyamine with a base.

In the preparation of the polyamine mixture, aniline to formaldehyde ratio can range from 1 to 50:1 and preferably 1.5 to 20:1. Illustrative but non-limiting examples of the acid catalyst can be selected from the group consisting of hydrochloric, formic, sulfuric, acetic, and phosphoric acids and mixtures thereof. The acid catalyst is employed in an amount of 0.1 to 90 and preferably 0.2 to 50% protonation of the amine groups.

Aniline and hydrochloric acid are typically mixed together to form an amine hydrochloride solution. The degree of protonation (moles of acid to moles of aniline) can be from 0.1% to 90%, and is typically between 0.2 to 50%. The aniline/aniline hydrochloride solution is then efficiently mixed with the formaldehyde solution with the aniline to formaldehyde ratio varying between 1:1 to 50:1. These ratios are adjusted to alter the oligomer and isomer distribution of the final product. The temperature of the reaction mixture is typically maintained below 50° C. to eliminate side product formation. The reaction mixture is then heated to a temperature in the range of 80°–120° C. to complete the reaction and conversion of aminobenzyl anilines and poly aminobenzyl anilines (also known as intermediates) to di(aminophenyl) methanes and polymethylene polyphenyl polyamines. After the reaction is complete, the acid is neutralized using a base (most typically sodium hydroxide). A large amount of salt is formed which is removed from the reaction mixture. Generally, the crude mixture of polyamines is washed with water to remove residual salt. Finally, the material is purified to remove unreacted aniline and water.

In accordance with the present invention, the process step of acidifying the polyamine can be described as follows. In a preferred embodiment of the invention, the polyamine is acidified either batch-wise or continuously after purification by treating it with anhydrous hydrogen chloride or hydrochloric acid. In another embodiment of the invention, the improved process comprises preparing a polyamine mixture by reacting aniline with formaldehyde in the presence of an acid catalyst, followed by partial neutralization of the resultant polyamine mixture, the improvement comprising effectively leaving the polyamine mixture slightly acidic prior to phosgenating the polyamine.

After the acidification, the concentration of acid in the polyamine mixture is from 1 to 1000 and preferably 2 to 50 ppm acid. When anhydrous hydrogen chloride is used in acidifying the polyamine, there occurs significantly less corrosion in the reaction equipment.

Illustrative but non-limiting examples of the acids useful herein can be aqueous or anhydrous hydrogen chloride, sulfuric acid, acetic acid, phosphoric acid or a mixture thereof. Preferably, anhydrous hydrogen chloride is employed.

The condition under which the acidification is conducted can be as follows:

| STAGE | BEFORE PURIFICATION | AFTER PURIFICATION | DURING PARTIAL NEUTRALIZATION |
|---|---|---|---|
| TEMPERATURE | 80–240° C. | 80–120° C. | 80–240° C. |
| TIME | 0–1 hr. | 0–14 days | 0–4 hr. |
| AMOUNT | 2–50 ppm | 5–50 ppm | 5–1000 ppm |

In the preparation of the polyisocyanates, the reaction of phosgene with the polyamine corresponding to the desired polyisocyanates, alternately referred to as amine phosgenation, is conducted in the presence of an inert solvent such as chlorobenzene. The polyamines are reacted with phosgene in molar ratios of 1.5 to 20 moles and preferably about 2.2 to 4.0 moles of phosgene per amine group. Upon completion of the phosgenation, the excess phosgene and hydrogen chloride formed are separately or simultaneously removed. The phosgenation product which is present after the removal of excess phosgene and HCl is in the form of a solution and may be separated into a gaseous phase containing volatile compounds having isocyanate groups and a liquid phase which is substantially completely crude polyisocyanate. The liquid phase can be worked up to produce polyisocyanates in a purer state.

In the practice of the invention, the process can be employed in preparing a variety of lighter color polyisocyanates. The polyisocyanates are denoted as lighter color polyisocyanates because they are useful in making lighter color foams. In the preparation of the foams, the polyisocyanates are reacted with an isocyanate reactive compound in the presence of a blowing agent.

The invention is further described by the following non-limiting examples.

EXAMPLES

Example 1

A sample of acidic polymethylene polyphenyl polyamine was prepared by partially neutralizing the acid catalyzed reaction product of aniline and formaldehyde with less than the theoretical amount of sodium hydroxide. After separation of the two layers, the polyamine was purified distillation to remove unreacted aniline and water, resulting in material which contained an acidity of 60 ppm of HCl. This material was then phosgenated using chlorobenzene as a solvent to obtain polymethylene polyphenyl polyisocyanate (PMDI) with a color rating between 0.32 to 0.36 as measured by absorbance at 430 nm. The color of a normal sample of this polyisocyanate, produced by phosgenating polyamine which was completely neutralized is rated at 0.50. Thus, the acidification resulted in a 28–36% reduction in color.

Analysis of this material, compared to normal material is as follows:

|  | PMDI from partial neut. | Normal PMDI |
|---|---|---|
| Color, 430 nm | 0.349 | 0.494 |
| % NCO | 31.8 | 32.0 |
| Acidity, ppm HCl | 260 | 360 |
| Viscosity, 25° C. | 161 | 172 |

As shown below, applications testing of the polymethylene polyphenyl polyisocyanate produced from partially neutralized polymethylene polyphenyl polyamine did not exhibit any unusual behavior when compared to normal polyisocyanate in a number of polyurethane foam formulations.

| System 1 | | |
|---|---|---|
| Gel time, (sec.) | 63 | 64 |
| Rise time, (sec.) | 78 | 78 |
| Rise height, (cm.) | 61.8 | 62.9 |
| Density, (pcf.) | 1.32 | 1.35 |
| System 2 | | |
| Gel time, (sec.) | 130 | 131 |
| Rise time, (sec.) | 144 | 152 |
| Rise height, (sec.) | 66.7 | 67.6 |
| Density, (pcf.) | 1.36 | 1.36 |

Example 2

A sample of purified polymethylene polyphenyl polyamine was acidified to 8 ppm with anhydrous hydrogen chloride. This material was allowed to stand for 3 days at about 100° C. before being continuously phosgenated in chlorobenzene solvent to give the polymethylene potyphenyl polyisocyanate. For comparison, a sample of the same polymethylene polyphenyl polyamine which was not treated with acid was phosgenated under the same conditions. Several samples of each material were analyzed and the results are given below as the average ± standard deviation:

|  | PMDI in Acidic MDA | PMDI in Control MDA |
|---|---|---|
| Number of samples | 7 | 5 |
| Color 430 nm | 0.237 ± 0.007 | 0.288 ± 0.015 |
| Color 520 nm | 0.034 ± 0.001 | 0.047 ± 0.011 |
| Acidity, ppm HCl | 211 ± 26 | 170 ± 4 |
| % NCO | 32.50 ± 0.09 | 32.47 ± 0.05 |
| Viscosity, 25° C. | 133 ± 3 | 127 ± 5 |
| Iron (ppm) | 2.4 ± 0.1 | 3.5 ± 0.1 |

In essentially the same manner as described in Example 1, application and testing of the polymethylene polyphenyl polyisocyanate produced from acidic polymethylene polyphenyl polyamine showed performance equivalent to that of the control sample.

Example 3 a) A system was designed to introduce aqueous hydrochloric acid into a crude polyamine stream (at about 100° C.) prior to purification. The acid flow rate could be adjusted to deliver between 5 to 50 ppm hydrochloric acid in the final product after neutralizing the excess base (see Table 1 below).

b) A system was designed whereby concentrated aqueous hydrochloric acid was introduced into the purification section (at about 180° C.) and regulated with a rotameter. The acid flow rate could be adjusted depending on production, and was also set to deliver between 5 to 50 ppm hydrochloric acid in the final product after neutralizing the excess base (see Table 1).

c) Anhydrous hydrogen chloride was connected through a regulator to the purification section (similar to section b) via stainless steel tubing. A needle valve was used to regulate the flow of anhydrous hydrogen chloride, and a flow tube was used to measure the flow. Flows were set to deliver between 5 and 50 ppm hydrochloric acid in the final product after neutralizing excess base (see the Table below).

| Run Number | Phosgenation Results | | Acidity | Method |
| --- | --- | --- | --- | --- |
| | 430 nm | 520 nm | | |
| Non-Acidified | | | | |
| 1 | 0.343 | 0.055 | Basic | |
| 2 | 0.363 | 0.086 | Basic | |
| 3 | 0.303 | 0.046 | Basic | |
| 4 | 0.469 | 0.057 | Basic | |
| 5 | 0.386 | 0.055 | Basic | |
| Avg. of individuals | 0.384 | 0.057 | | |
| Acidified | | | | |
| 1 | 0.298 | 0.042 | 10 ppm | i |
| 2 | 0.300 | 0.055 | 12 ppm | ii |
| 3 | 0.259 | 0.039 | 30 ppm | ii |
| 4 | 0.239 | 0.051 | 20 ppm | iii |
| Avg of individuals | 0.282 | 0.048 | | |
| Average Percent Change | −26% | −16% | | |
| Significance Level | >99.9% | >98.0% | | | i. Acidification of crude MDA with aqueous HCl (a)
ii Acidification in the Purification section with aqueous HCl (b)
iii Acidification in the Purification section with anhydrous HCl (c)

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An improved process for preparing a polyamine by reacting aniline with formaldehyde in the presence of an acid catalyst, followed by neutralizing the resultant polyamine with a base, the improvement comprising effectively acidifying the polyamine in an amount sufficient to produce an acidic polyamine after the neutralization.

2. The process of claim 1 wherein the step of acidifying the polyamine comprises adding from about 2 to 5 ppm of anhydrous hydrochloric acid to the reaction product of aniline and formaldehyde at a temperature of about 80° to 420° C.

3. The process of claim 1 wherein the step of acidifying the polyamine is conducted at a stage of purifying the polyamine.

4. The process of claim 3 wherein the stage of purifying the polyamine comprises removing untreated aniline and water.

5. The process of claim 1 wherein the acidification of the polyamine comprises adding a small but effective amount of an acid to a base-neutralized polymethylene polyphenyl polyamine.

6. The process of claim 1 wherein the polyamine is acidified by partially neutralizing an acidified polyamine.

7. The process of claim 1 wherein the level of acidification of the polyamine is from 1 to 1000 ppm.

* * * * *